United States Patent [19]
Hawkins et al.

[11] Patent Number: 6,058,520
[45] Date of Patent: May 9, 2000

[54] LINER MECHANISM FOR DRY TOILETS

[76] Inventors: Robert D. Hawkins; James A. Hawkins, both of Atlanta Trent Lock, Nottingham NG10 2FY, United Kingdom

[21] Appl. No.: 09/319,502

[22] PCT Filed: Dec. 3, 1997

[86] PCT No.: PCT/US97/22412

§ 371 Date: Jun. 7, 1999

§ 102(e) Date: Jun. 7, 1999

[87] PCT Pub. No.: WO98/26701

PCT Pub. Date: Jun. 25, 1998

[30] Foreign Application Priority Data

Dec. 14, 1996 [GB] United Kingdom ............... 9626043

[51] Int. Cl.⁷ .................................................. A47K 11/06
[52] U.S. Cl. ........................................................... 4/484
[58] Field of Search ............................... 4/449, 452, 484

[56] References Cited

U.S. PATENT DOCUMENTS

| | | | |
|---|---|---|---|
| 4,519,104 | 5/1985 | Thornton et al. | 4/484 X |
| 4,870,709 | 10/1989 | Nilsson | 4/484 |

*Primary Examiner*—Charles E. Phillips

[57] ABSTRACT

Disclosed is a mechanism for gripping and moving liner sheet (10) including a detachable cartridge having a frame (34) holding a supply of liner sheet (10) on a roll (24) for the purpose of forming a disposable liner inside a dry toilet or other adapted waste receptacle. The cartridge has spaced apart feed pads (54) with low friction faces (20) which automatically align with high friction surfaces (18) on moveable belts (12) as the frame (34) is attached to the waste receptacle. Edge portions (26) of the sheet (10) are guided between the low friction surfaces (20) and the belts (12). When the belts (16) are moved, the sheet (10) is pulled from the roll (24) and the edge portions (26) are transported around the perimeter of the waste receptacle by the belts (12) in cooperation with the low friction surfaces (20) thus causing a liner to be formed inside the waste receptacle.

5 Claims, 3 Drawing Sheets 6,058,520

LINER MECHANISM FOR DRY TOILETS

TECHNICAL FIELD

This invention relates to a method for supplying and conveying the liner film material used for lining the bowl of dry toilets and other waste receptacles.

BACKGROUND

International Patent Application No. US/95/03004 discloses a method for lining a toilet bowl with a thin film in the form of a continuous rectangular sheet supplied from a roll. A conveyance apparatus held and transported two opposed edges of the sheet around the perimeter of the bowl thus draping the sheet into the bowl to form a liner. The edges of the sheet were shown to be held by being impaled on pins which projected from two moving belts each of which traversed one half of the perimeter of the toilet bowl. The edges of the sheet were restrained from slipping off the pins by fixed guide surfaces which followed the path of the belts around the bowl and which would press lightly against the surface of the sheet near the pins to prevent the sheet from being dislodged from the pins.

That method of holding the edge of the liner sheet by piercing it with pins has several inherent complications which can require additional apparatus to correct and which can make the toilet more difficult to service. There is first the fact that some liner sheet material such as high density polyethylene can be tough, thin and slippery and will not puncture easily unless held under tension. Then, once the sheet is punctured by the point of the pin and is pushed further down the wider shank of the pin it will grip the pin to the extent that it will not easily come off, which it must do after being conveyed out of the bowl. Removal of the sheet from the pin is further restricted when the belt is on an outside bend which spreads the tips of the pins further apart requiring the sheet to stretch between adjacent pins. The solution to these problems requires additional apparatus to create the tension to facilitate the initial piercing by the pins and to create the mechanical forces required for removal of the sheet from the pins.

Furthermore, to service a film lined toilet it is desirable to be able to install a new roll of liner material with minimum difficulty, ideally with a feed mechanism requiring little or no manual intervention. The need for the liner sheet to be held under tension before the pins can pierce it and carry it forward makes it difficult to provide a feed mechanism that will work on the leading edge of the sheet which has no tension.

DISCLOSURE OF INVENTION

The requirement to pierce the liner sheet with pins, and the need for additional apparatus to make that process work with thin sheet materials, and the difficulty of providing a self feeding, supply mechanism, can be overcome by the present invention which provides a means for gripping the liner film without piercing the film surface and yet still use a simple belt conveyor.

This can be accomplished by first providing a frictional means for holding and transporting the liner sheet. Specifically, a high friction surface on the outer face of the moving conveyor belt can be made to cooperate with a stationary, low friction guide surface to form a passageway for the edges of the thin liner sheet. When the edge of the liner sheet are fed between the high friction belt face and the contiguous, low friction guide surface it is gripped by the high friction belt face and moves with the belt while sliding over the low friction surface.

This frictional action can be further emphasised if it is considered that the high friction surface on the belt face could be an abrasive grit and the low friction surface could be a soft, stationary brush and the liner sheet, a thin slippery plastic film. The brush will offer negligible resistance to the lateral movement of the slippery plastic film, easily sliding over the surface. Whereas, the abrasive grit will embed itself into the surface of the plastic film and as the belt moves laterally it will drag the film with it. When the pressure of the brush is removed from the plastic film it will immediately fall away from the grit on the face of the belt and be released. Conversely, if the brush is brought into contact with the belt face any film in between the brush and the belt face will be instantly gripped by the belt face. Only in those portions of the belt pathway where bowl lining sheet is to be held and transported is it necessary to provide the low friction surface contiguous to the belt face.

Alternatively, instead of stationary brushes, the low friction, pressure applying surface could be provided by the use of elastic pads, rollers or another moving belt. However, each of these methods have disadvantages. Pads made of elastic materials are easily abraded by the high friction surface of the belt during those operating intervals when the liner sheet has not yet been fed into the conveyance apparatus. Furthermore, the surface of an elastic pad cannot be made to yield sufficiently to a rough surface and still maintain uniformly distributed pressure. Rollers would result in very low friction force against the moving liner sheet but they would have to be small, numerous and close together to provide sufficient attachment of the liner to the belt, and unless the rollers are soft only a small portion of the available friction surface would be under pressure. Furthermore, the interval between adjoining rollers leaves a space where the leading edge of a new liner sheet being fed around the bowl can separate from belt face and soft rollers would have a tendency to pick up the leading edge of the liner sheet causing it to wrap around the roller. A moving belt system that would put uniform pressure on the liner sheet is too complicated and too bulky to be employed in the space available beneath the rim of the toilet bowl. A pressure pad in the form of a brush is unique in the way in which individual bristles can apply pressure independently of the action of the adjoining bristles and thus collectively distribute the applied pressure more uniformly over a the rough moving surface of the belt. The bristles can also be inclined in the direction of the motion of the belt to further improve the the pressure distribution while at the same time reducing the frictional force on the brush.

With the use of friction force it is not necessary for the liner sheet to be held under tension in order for it to become attached to the belt. Therefore, the leading edge of a sheet will be securely held on the face of the belt when one side of the sheet is pressed against it by pressure from a low friction surface positioned on the other side of the sheet. This action can be used to provide a self threading, self feeding mechanism attached to a spool or cartridge from which the supply of liner sheet is automatically fed into the conveyance apparatus. For example, two small brush pads can be rigidly connected to the cartridge in separated positions and located so that the two leading corners of the folded sheet coming from the cartridge can also be separated and held in front of corresponding faces of the separated brush pads. When these brush faces are brought into contact with high friction belt faces the sheet corners in between will be gripped by the belts. As the belts move the sheet will be pulled from the the roll. If other brushes or pressure applying surfaces, not connected to the cartridge, are positioned along the belt and adjacent to the cartridge brushes, then the sheet will continue to be gripped by the moving belt after it has passed beyond the cartridge brushes.

A self threading, self feeding, liner film, cartridge assembly could consist of a frame containing a roll of folded, liner film sheet, the frame supporting two separated pressure pads having outward, low friction, faces, each pressure pad having associated means for holding a leading corner of liner film sheet against the outward face so as to be able to press the liner film sheet against a conveyor belt surface when the cartridge is connected into a toilet bowl apparatus. The cartridge can be further equipped with guides and latching devices to automatically secure the cartridge in the correct position with respect to the toilet apparatus.

BRIEF DESCRIPTION OF DRAWINGS

This invention will be further described by way of example only, by reference to the accompanying and purely diagrammatic drawings, in which.

BEST MODE FOR CARRYING OUT INVENTION

Figure 1:
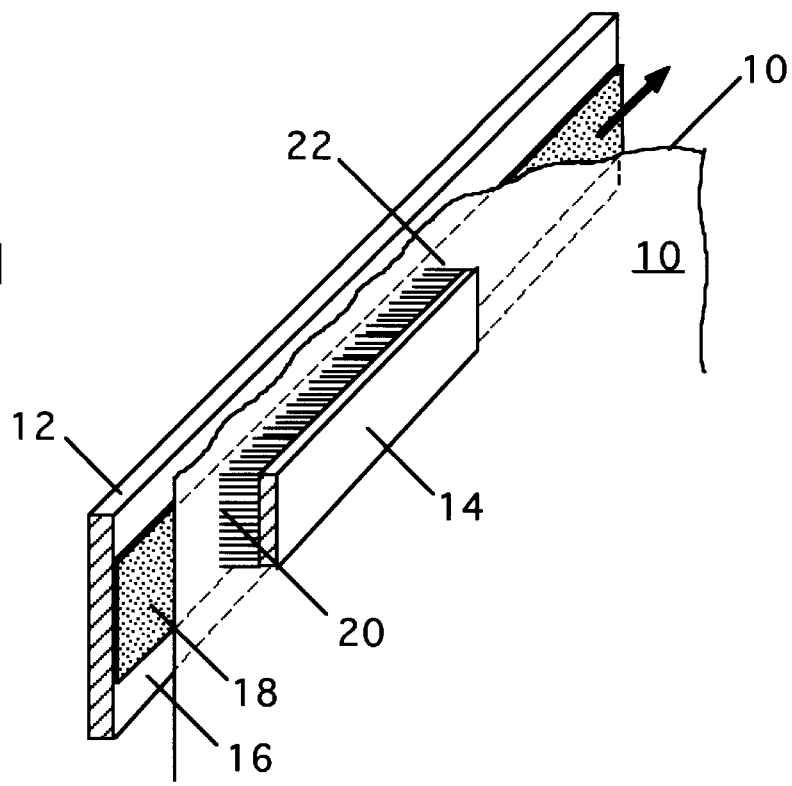
FIG. 1 is a cut away view through the conveyor belt portion of the liner conveyance apparatus.

A method by which a toilet bowl liner sheet 10 can be held by a moving conveyor belt 12 as shown in FIG. 1. The liner sheet 10 is positioned between the conveyor belt 12 and a pressure pad 14. The conveyor belt 12 has an outer face 16 a portion of which supports a high friction material 18 such as abrasive grit and the pressure pad 14 has a contact face 20 composed of low friction material such as brush fibers. The liner sheet 10 is pressed against the high friction material 18 by the contact face 20 of the pressure pad 14. When the conveyor belt 12 moves, the high friction material 18 grips the adjacent face of the liner sheet 10 and drags it in the direction of the motion. Simultaneously, the other face of the liner sheet 10 slips freely against the low friction contact face 20 of the pressure pad 14. When the conveyor belt 12 moves beyond the end 22 of the pressure pad 14, the liner sheet 10 will no longer be gripped by the high friction material 18 and will fall away from the moving conveyor belt 12.

Figure 2:
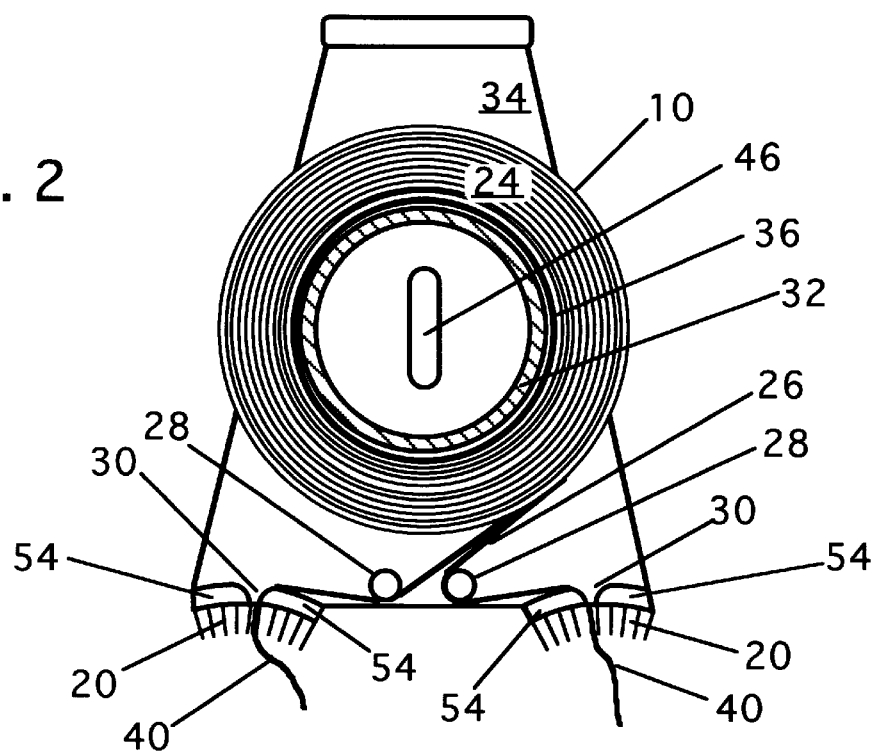
FIG. 2 is a section view of a liner supply cartridge as seen from below.
Figure 3:
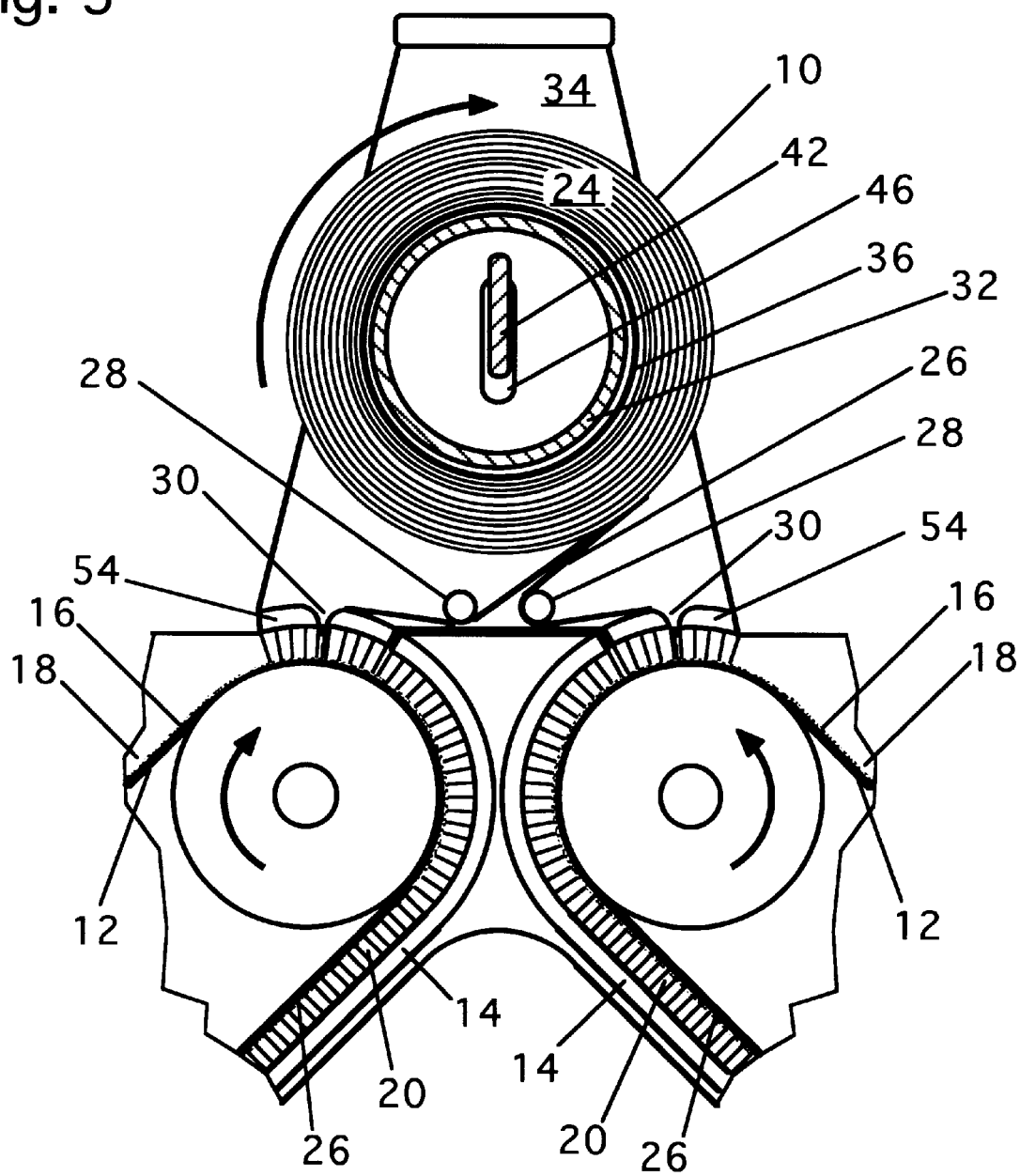
FIG. 3 is a section view of a portion of the liner conveyance apparatus connected to the liner supply roll as seen from below.

The liner sheet 10 can supplied to the conveyor belt 12 from a cartridge as shown in FIG. 2. The cartridge has a frame 34 supporting a roll 24 of liner sheet 10. The liner sheet 10 has been folded to place the two side edges 26 together at one end of the roll 24. Coming from the roll 24 the two adjacent side edges 26 pass between central guide surfaces 28 before being separated and individually guided by laterally spaced surfaces 30 to a position where the leading corners 40 of the liner sheet edges 26 are held in front of laterally spaced, feed pads 54 each having a low friction contact face 20. When the cartridge is brought into position to supply liner sheet 10 to the conveyance apparatus as shown in FIG. 3, the leading corners of the liner 40 are pressed against corresponding, spaced apart, conveyor belts 12 by the feed pads 54 and gripped by the high friction belt surface 18. The feed pads 54 are positioned adjacent to the leading edge of the pressure pads 14 which are affixed to the conveyance apparatus. Movement of the conveyor belts 12 will pull the liner sheet edges 26 from beneath feed pads 54 and along the passageway formed by the belts 12 and the pads 14. As the conveyor belts 12 traverse around the perimeter of the toilet bowl the edges 26 of the liner sheet 10 are separated further thus opening and spreading the liner sheet 10 within the bowl. The liner supply roll 24 has a core 36 which slides over a hollow spindle 32. The spindle 32 may support a means to partly restrain the free rotation of the core 36 and thereby increase the tension force in the liner sheet 10 thus assisting the alignment of the edges 26 with the belt face 16.

Figure 4:
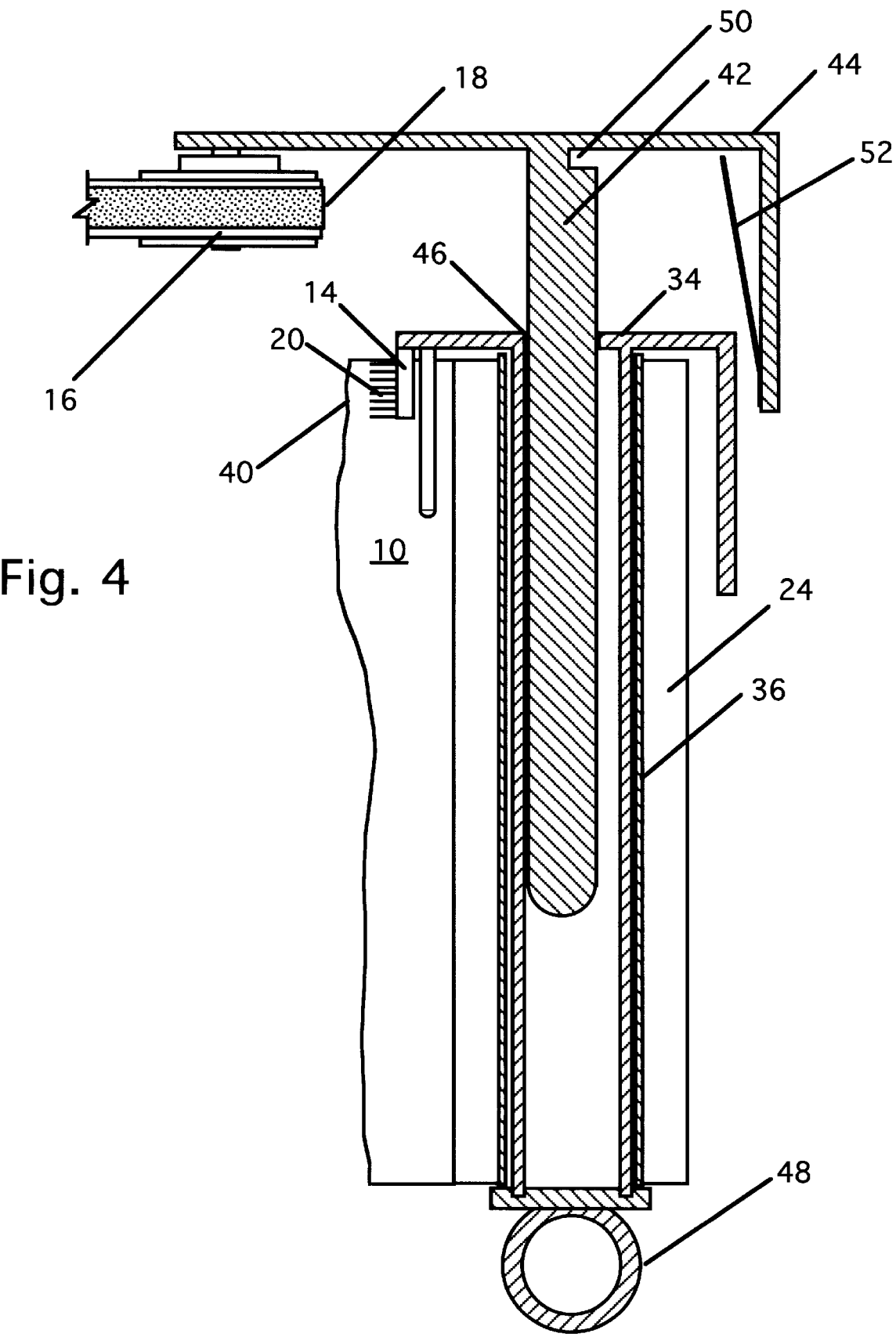
FIG. 4 is another section view of the liner supply cartridge in relation to the conveyance apparatus as seen from the side.

A means to install and secure the cartridge assembly against an associated conveyance apparatus is illustrated in FIG. 4. A guide bar 42 projecting downward from the support structure 44 and passing through a guide hole 46 in the support surface 34 for the cartridge assembly 38. The guide bar 42 is positioned so as to space the feed pads 54 together with the projecting portion 40 of the liner sheet 10 away from the belt face 16 while the cartridge assembly is being pushed upwards into a position where it will be aligned with the belt surface 16. A knob 48 on the end of the spindle 32 facilitates the manual positioning. When the cartridge assembly reaches the position where it is aligned with the belt surface 16 a notch 50 on the guide bar 42 in cooperation with a flat spring 52 causes the cartridge assembly to slide towards belt surface 16 which presses the projecting portion 40 of the liner sheet 10 against the belt face 16 to be gripped by the high friction material 18. Simultaneously the notch 50 will project over the lower side of the support surface 34 and thereby secure the cartridge assembly in the aligned position. An empty cartridge assembly can be removed by pushing it against the flat spring 52 until the notch 50 clears the support surface 34 and the guide hole 46 slips down onto the unnotched portion of the guide bar 42.

What is claimed is:

1. A cartridge assembly for the supply of liner sheet for the purpose of forming a disposable liner inside a dry toilet or other waste receptacle, the assembly to include; a supporting frame, a roll of rectangular liner sheet supported on the frame, the roll being free to rotate on the frame as the liner sheet is unwound from the roll, means for securing the frame in a readily detachable manner to a waste receptacle, spaced apart low friction surfaces on the frame which align with movable high friction belt surfaces on the receptacle to define pathways for edge portions of the liner sheet, and guide surfaces on the frame to separate and position leading edge portions of the liner sheet in front of the low friction surfaces so that when the frame is secured to the waste receptacle the edge portions of the sheet will be gripped within their respective pathways and thus be pulled from the roll and into the waste receptacle as the belts are caused to move.

2. A cartridge assembly according to claim 1 wherein there is included means for regulating the tension force required to unwind the roll of liner sheet.

3. A mechanism for transporting and forming a disposable liner inside a dry toilet or other waste receptacle comprising; a receptacle, a substantially continuous rectangular sheet capable of being used as a receptacle liner, intermittently movable belts positioned around the perimeter of the receptacle, the belts having a face consisting at least in part of material having high friction, stationary low friction surfaces adjacent to the belts which cooperate with the face of the belts to form a pathway in which edge portions of the rectangular sheet are gripped and thereby transported around the perimeter of the receptacle by the movement of the belts, and a detachable cartridge containing a supply of rectangular sheet, the cartridge having means to register the edge portions of the sheet against the high friction face of the belts thus causing the edge portions to be pulled into the pathway as the belts are moved.

4. A mechanism according to claim 3 wherein the low friction surfaces are composed of cantilevered fibres in the form of bristle or pile.

5. A mechanism according to claim 3 wherein the high friction portion of the face of the belt is composed of a coating of abrasive granules.

* * * * *